United States Patent [19]
Allen et al.

[11] 4,196,036
[45] Apr. 1, 1980

[54] TIRE BEAD RING ASSEMBLY MACHINE

[75] Inventors: Ronald E. Allen; David W. Cusimano, both of Tuscaloosa, Ala.

[73] Assignee: The B. F. Goodrich Company, Akron, Ohio

[21] Appl. No.: 935,297

[22] Filed: Aug. 21, 1978

[51] Int. Cl.² ............... B29H 17/32; B29H 17/34
[52] U.S. Cl. .................... 156/422; 156/136; 156/460
[58] Field of Search ........... 156/123 R, 136, 394 R, 156/422, 460

[56] References Cited
U.S. PATENT DOCUMENTS

| | | | |
|---|---|---|---|
| 1,498,532 | 6/1924 | Ambler | 156/136 |
| 1,553,514 | 9/1925 | Denmire | 156/422 |
| 1,871,119 | 8/1932 | Denmire | 156/460 |
| 1,931,924 | 10/1933 | Denmire | 156/460 |
| 3,532,578 | 10/1970 | Chronister | 156/460 |
| 3,904,471 | 9/1975 | Kubinski | 156/405 |
| 3,962,020 | 6/1976 | Yonekawa et al. | 156/460 |
| 4,061,525 | 12/1977 | Slezak | 156/460 |
| 4,087,298 | 5/1978 | Mangun et al. | 156/136 |

*Primary Examiner*—John E. Kittle
*Attorney, Agent, or Firm*—Joseph Januszkiewicz

[57] ABSTRACT

A tire bead ring machine for applying a filler gum onto a tire bead ring slightly ahead of a flipper cloth which is thereafter wrapped around the tire bead and filler gum to completely encompass the filler gum and tire bead ring to make a tire bead ring assembly.

10 Claims, 14 Drawing Figures

TIRE BEAD RING ASSEMBLY MACHINE

BACKGROUND OF THE INVENTION

This invention relates to a tire bead machine and more particularly to a tire bead ring assembly machine for wrapping a filler gum and flipper cloth into and around a tire bead ring.

In the manufacture of pneumatic tire, an inextensible bead reinforces the respective side tire openings to render them non-stretchable. The tire beads are composed of a plurality of closely spaced parallel wires that are passed in the same plane through an extruder which places a coating of rubber around and between the wires to form a flat ribbon. The ribbon is then spirally wound upon itself a number of convolutions to build up a formed grommet or bead ring having the desired thickness and tensile strength. After the grommet or bead ring is so formed, a filler gum is applied circumferentially around the bead. The bead is then transferred to another machine which wraps a flipper cloth or strip around the tire bead so formed to facilitate its application to the respective sides of the tire carcass.

Heretofore, these operations were done separately and transferred from machine to machine. The operations were labor intensive. The present invention takes a formed tire bead and applies the gum strip as well as the flipper cloth or material in sequence on the same machine in substantially less time than heretofore possible. The quality of the finished bead is superior to those made on separate machines since the materials can be proportioned more easily and eliminates the distortion that can occur in repeated transfer and storage.

SUMMARY OF THE INVENTION

The present invention contemplates an apparatus for fabricating a tire bead ring assembly wherein a tire bead made of a plurality of closely spaced parallel wires in a flat annular ribbon form has a filler gum wound around the exterior thereof. In addition, a flipper cloth or strip of fabric material is then wound and stitched around the bead ring and filler gum as the filler gum is shaped and stitched to the bead ring to make a bead ring assembly for use in the lower bead region of the sidewalls of a tire.

DETAILED DESCRIPTION

Figure 2:
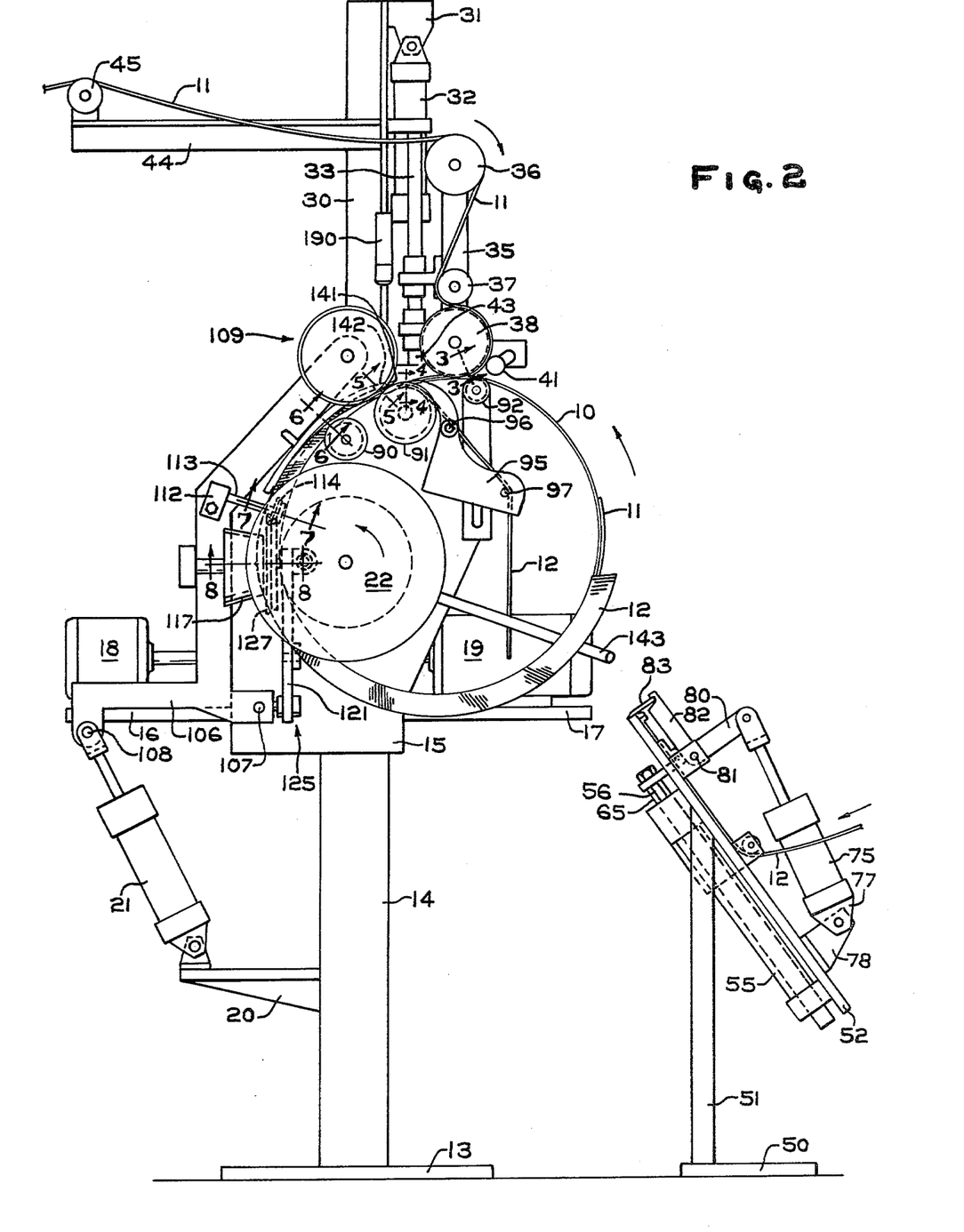
FIG. 2 is a front elevational view of a tire bead ring assembly machine embodying the features of the invention as shown in FIG. 1 with a bead partially complete.
Figure 8:
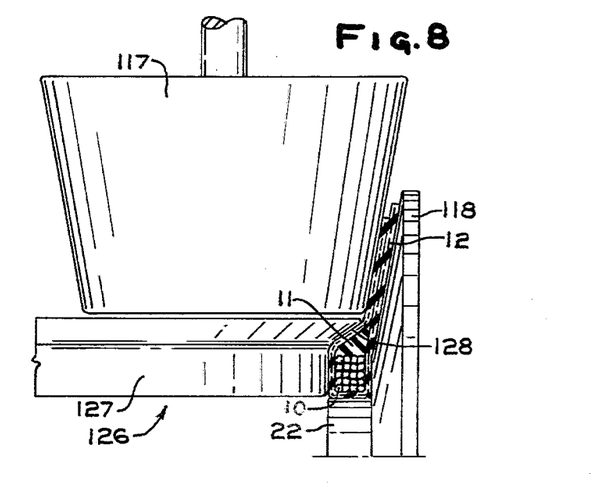
FIG. 8 is an enlarged fragmentary view of a pair of stitching rollers with the fourth guide roller shaping the tire bead assembly to its final form, which view is taken on lines 8—8 of FIG. 2.

Referring to the drawings wherein like reference numerals designate like or corresponding parts throughout the several views, there is shown in FIGS. 2 through 8 a bead ring or grommet 10 with a filler gum 11 positioned thereon and partially encased by a rubberized flipper strip cloth or material 12. FIG. 2 illustrates the bead ring 10 as positioned on the machine with the filler gum 11 being applied to the bead ring as the bead ring 10 is being rotated in a counterclockwise direction and a flipper strip 12 being applied to the bead ring 10 and filler gum 11. The filler gum 11 is applied as a circular cross-sectional strip (FIGS. 3 and 4) while the flipper strip 12 is applied as a flat strip (FIG. 4) and lapped to form a skirt as shown in FIG. 8 to facilitate the application of such bead ring assembly into the carcass of a pneumatic tire to retain the bead ring in position on the tire against the road forces on the tire and against the bursting pressure of the inflating air.

The apparatus or machine for fabricating the bead ring assembly includes a base 13 suitably bolted to the floor. Base 13 supports a column 14 upon which is mounted a support means or plate member 15 supporting a pair of spaced brackets 16 and 17. Bracket 16 supports a drive motors 18, while bracket 17 supports a pulse generator 19 for a purpose to be described. Column 14 also has secured to it bracket 20 which has the head end of a pneumatic cylinder 21 suitably pivotally connected thereto. Motor 18, a standard fixed speed motor through a suitable train of gears, and a suitable foot switch operates to rotate a main wheel or guide roller 22 that is journaled on the plate member 15.

Suitably secured to plate member 15 and extending upwardly and outwardly therefrom is column 30 with an upper side bracket 31. The head end of a pneumatic cylinder or filler applier cylinder 32 is secured to bracket 31 while its piston rod 33 is secured to a movable bracket 34. Bracket 34 has a plate member or support member 35 connected thereto for movement with bracket 34 upon actuation of cylinder 32. The upper end of plate member 35 supports an idler roller 36 over which is trained a filler gum strip 11 for directing it onto a lower idler roller 37. Mounted on the lowermost end portion of plate member or support member 35 is a filler application roller or guide roller 38 having a plurality of circumferentially spaced projections 40 (FIG. 3) on the circumferential center-line thereof. The projections 40 on such guide roller 38 cooperate with roller 41 which upon retraction of the piston rod of cylinder 32 will break the filler gum strip 11 in a manner to be described. Bracket 34 is guided in its vertical reciprocal movement by guide rod 43. Extending laterally outwardly from the upper end portion of column 30 is a bracket 44 supporting a guide roll 45 to facilitate in the guiding of the filler gum strip 11 from a suitable source of supply to the idler roller 36 and the guide roller 38.

Mounted on a base 50 closely adjacent to base 13 is a column 51 having a bracket 52. Bases 50 and 13 could be a common support means supporting columns 14 and 51; however, for convenience such columns and bases are shown as separate support means. Bases 13 and 15 along with the respective columns and brackets comprise support means for the bead ring assembly machine. A cylinder 55 is mounted on the underside of bracket 52, having its piston rod 56 extending outwardly therefrom. The end portion of rod 56 has a bracket means 57 supporting a pair of lugs 58 and 59 (FIG. 9) which support a pair of cams 60, 61 and roller 62 past which the rubberized flipper strip material 12 is drawn. Cams 60 and 61 in cooperation with roller 62 permits the flipper strip material 12 to be drawn therebetween and advanced to the bead to be covered. In the event the strip 12 is cut, the cams 60 and 61 with roller 62 hold on to the flipper strip material so that it can be advanced for a subsequent application. The bracket 57 has a guide rod 65 connected to it. The one end of rod 65 is slidable received by a bushing 66 (FIG. 9) secured to the underside of bracket 52.

Figure 9:
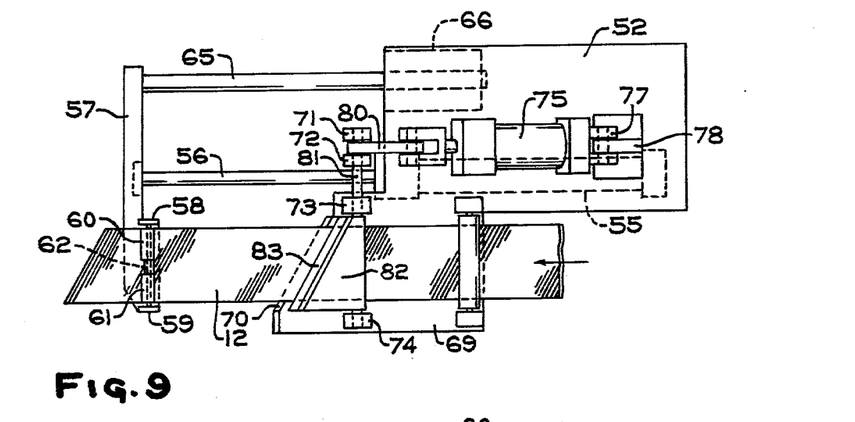
FIG. 9 is a fragmentary plan view of the flipper cloth dispensing means in the extended position.
Figure 10:
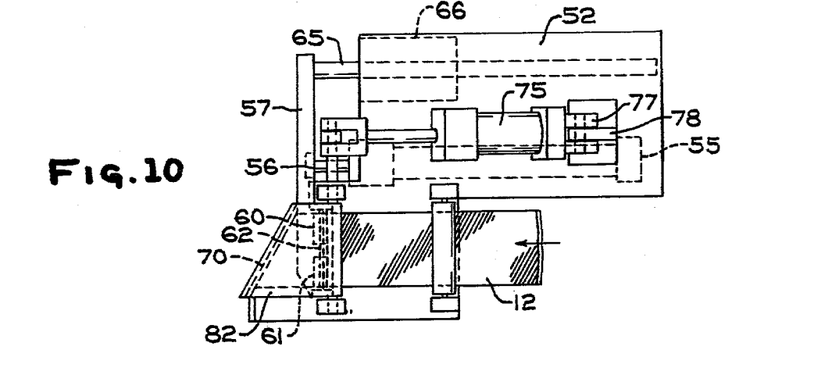
FIG. 10 is a fragmentary plan view of the flipper cloth dispensing means in the retracted position.

As shown in FIGS. 9 and 10 a knife edge 70 is mounted on a bracket 69 that extends laterally outwardly from the forward end portion of bracket 52. A plurality of bushings 71, 72, 73 and 74 are mounted in alignment on brackets 52 and 69. A pneumatic cylinder 75 has its head end pivotally connected to bracket 52 by a clevis 77 and bracket 78. The rod end of cylinder 75 is pivotally connected to one end of a lever member 80. The other end of lever member 80 is keyed to a shaft 81. Shaft 81 has a cutter holder 82 keyed thereto such that rotation of shaft 81 will pivot the cutter holder 82 about shaft 81. A cutter blade 83 mounted in cutter holder 82 cooperates with knife edge 70 to sever the flipper strip material 12 in a manner to be explained.

Various driven elements hereinafter referred to are suitably driven or are idler rollers on plate member 15, and support the bead ring assembly in a manner to be described in detail. Besides the guide roller 22, guide rollers 90, 91 and 92 are mounted on plate member 15. Guide roller or first guide roller 92 cooperates with guide roller 38 to apply the filler gum 11 to the bead. An adjustable bracket 95 is secured to plate member 15, having a guide rollers 96 and 97 journaled thereon. Guide roller or second guide roller 91 and guide rollers 96 and 97 guide the flipper cloth or strip material 12 from a supply roll not shown onto the bead hinge assembly being formed in the machine. Second guide roller 91 has a circumferential groove 100 (FIG. 4) around the mid circumference thereof. Such groove 100 is substantially the same width as the bead ring 10. Roller 91 has a pair of spaced grooves 101 and 102 along the outer edge portion to accommodate a pair of guide bars 103 (FIG. 4) which facilitate the placing of the flipper cloth or strip material 12 by the operator onto the second guide roller 91.

The intermediate portion of a lever arm 106 is pivotally connected as at 107 to the lower end portion of plate member 15. The one end of lever arm 106 is pivotally connected as at 108 to the rod end of pneumatic cylinder 21 whereby the other end of lever arm 106, which supports stitching roller 109, can be moved into engagement with the filler gum on the bead ring or outwardly away therefrom. Stitching roller 109 (FIG. 5) has a central contoured portion as shown in cross-section in FIG. 5 and an annular flanged portion 111. Roller 109 is operative to press the bead ring and flipper strip material 12 into the central groove 100 of second guide roller 92 while simultaneously shaping the filler gum and pressing the filler gum into firm engagement with the bead ring 10. Mounted on lever arm 106 between stitching roller 109 and pivot 107 is a bracket 112 journaling via shaft 113 a stitching roller 114 thereon. Roller 114 has a relatively wide cylindrical portion 115 (FIG. 7) and a flanged portion 116 which flanged portion flatens out the filler gum and moves the flipper cloth or strip into a vertical altitude. Mounted on lever arm 106 closely adjacent to roller 114 is a tapered stitching roller 117 which cooperates with a tapered portion 118 of fourth guide roller 22 to shape the flipper cloth and abut the two side portions of such flipper cloth into abutting contact with each other as shown in FIG. 8.

Figure 11:
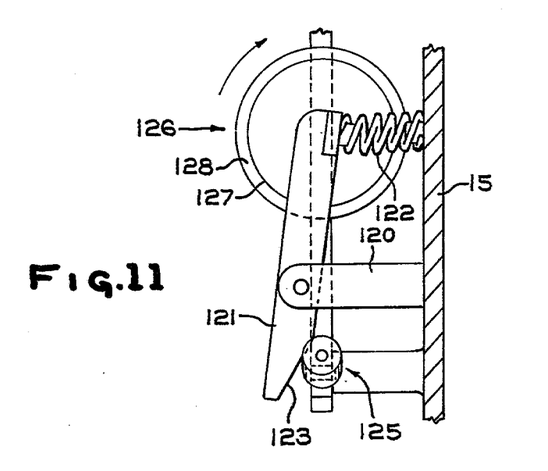
FIG. 11 is an enlarged fragmentary side elevation view of a stitching roll and the cam actuating means for the stitching roll.
Figure 12:
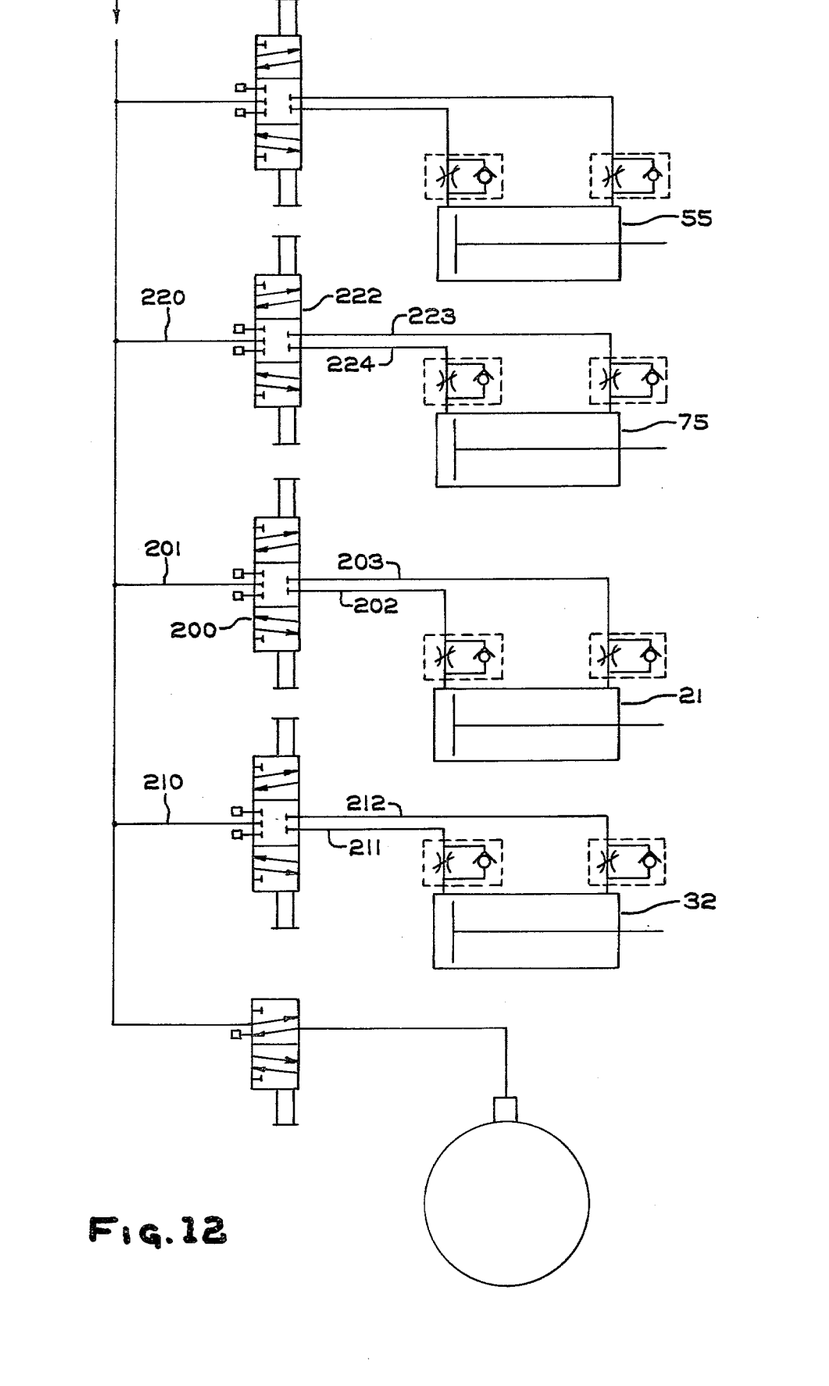
FIG. 12 is a schematic drawing of the pneumatic controls for the tire bead assembly machine.
Figure 13A:
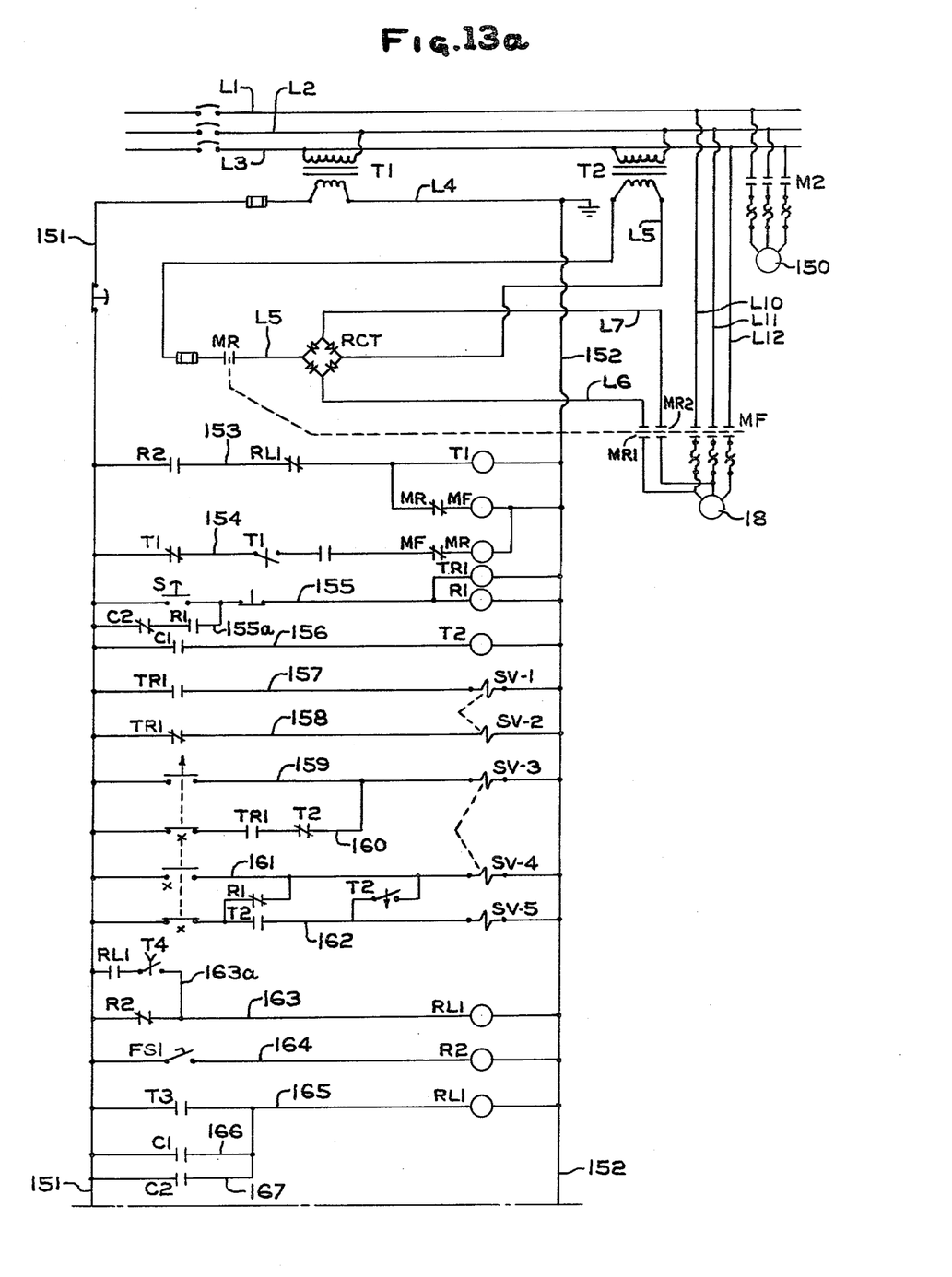
FIGS. 13a and 13b are a schematic electrical drawing with a portion as a block diagram of a preferred embodiment of the present invention applied to the tire bead assembly machine.
Figure 13B:
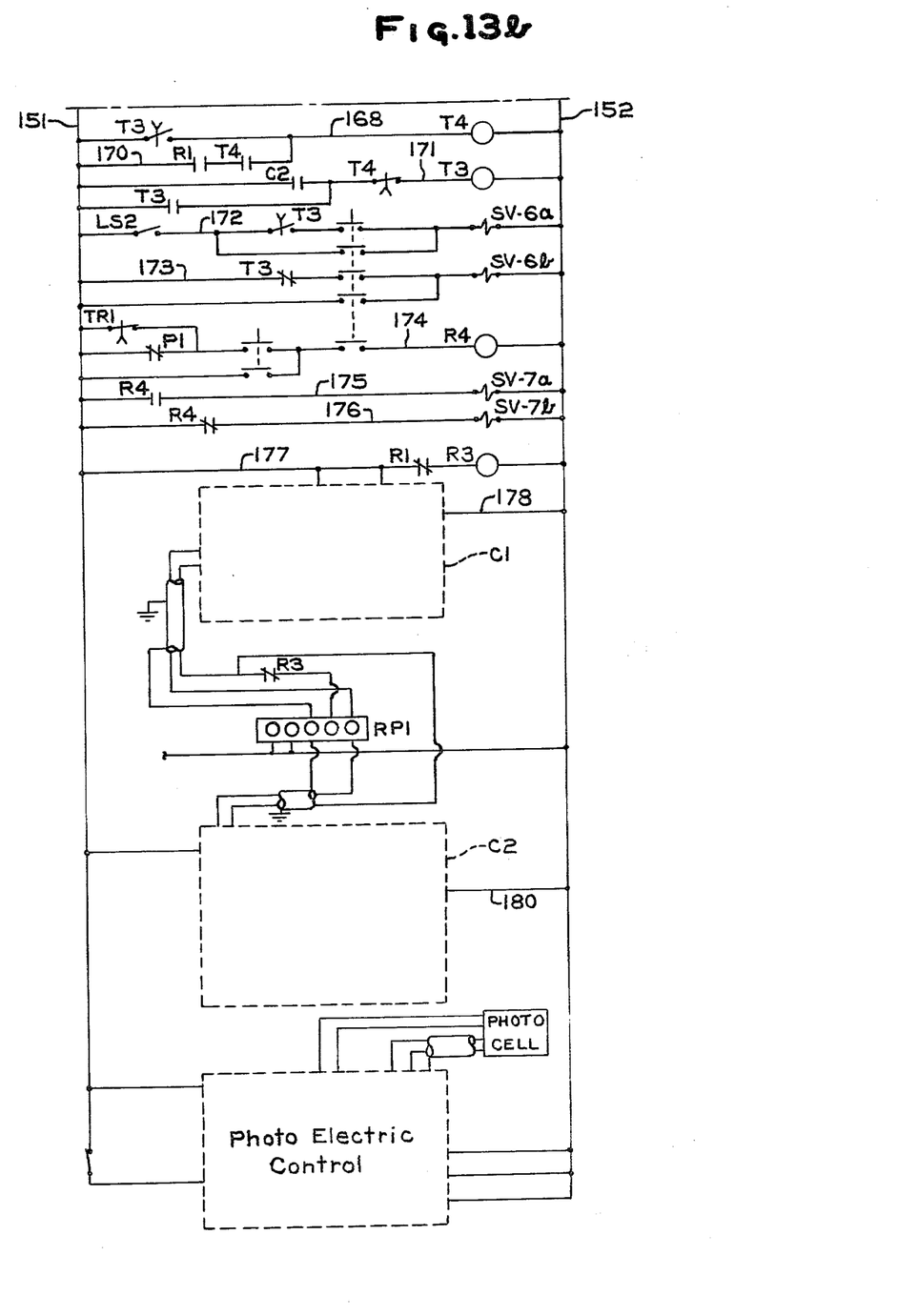

A bracket 120 (FIG. 11) is suitably secured to the plate member 15. The intermediate portion of a lever arm 121 is pivotally mounted on bracket 120 which lever arm 121 has one end recessed to receive a compression spring 122 operative to bias lever arm 121 in a counterclockwise direction as viewed in FIG. 11. The other end of lever arm 121 is beveled as at 123 for cooperation with a cam or roller 125. A stitching roller 126 is journaled on the one end of lever arm 121. Roller 126 has a cylindrical surface 127 and a beveled surface 128 (FIG. 8) to effect a completion of the turn up of the flipper strip material around the bead ring 10 and the gum strip or filler gum 11 in cooperation with the stitching roll 117. With the pneumatic cylinder 21 in the inoperative position (FIG. 1), the roller 125 is moved upward against the lever arm and compresses spring 122 to move stitching roller 126 towards the plate member 15 and away from the bead ring 10. In the operative position, wherein the head end of pneumatic cylinder 21 is actuated, the roller 126 is moved downwardly and spring 122 biases roller 126 into engagement with the bead ring 10 and flipper material 11 into the position shown in FIG. 8. Cam roller 125 is journaled on a shaft secured to the lever arm 106 and is pivoted therewith.

A guide roller 90 (FIGS. 2 and 6) referred to as third guide roller is a cylindrical roll flanged on one end as at 131. Slidably mounted on roller 90 for movement in an axial direction is a sleeve 132 with a flanged end portion 133. A sleeve 134 is secured to the other end of roller 90. Seated against sleeve 134 and encompassing sleeve 132 is a spring 135 operative to bias sleeve 132 and its flange 133 into abutting contact with the flipper strip 12 and bead ring 10.

Figure 1:
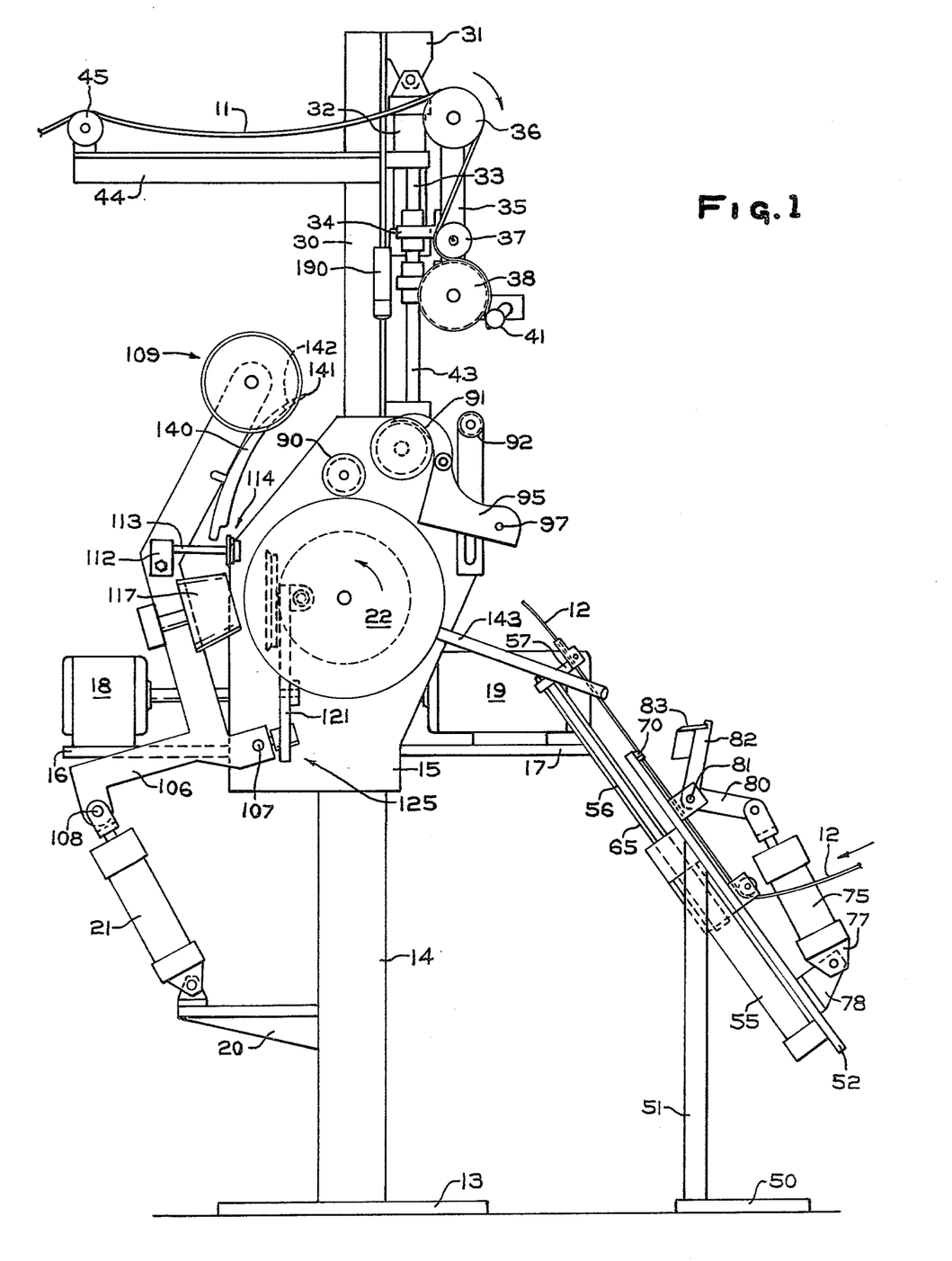
FIG. 1 is a front elevational view of a tire bead ring assembly machine embodying the features of the invention without a bead therein.
Figures 3, 4, 5, 6:
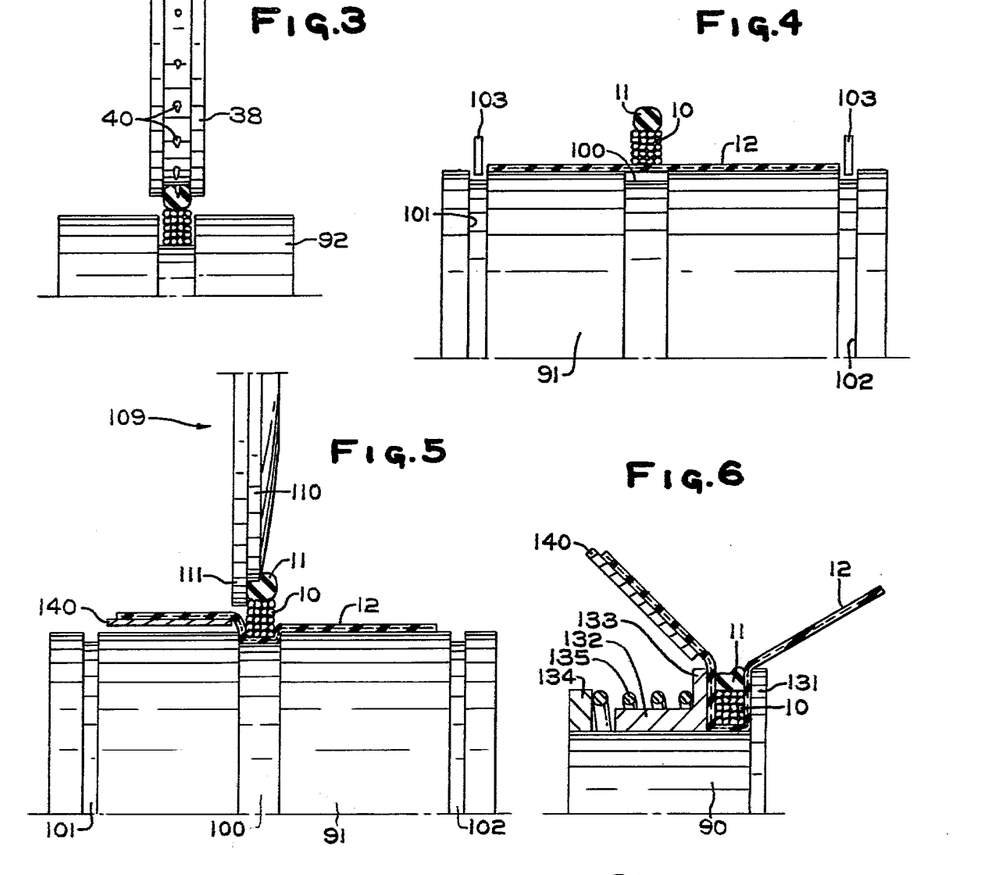
FIG. 3 is an enlarged fragmentary view of a first guide roller cooperative with a filler gum guide roller showing the fill gum being applied to the bead ring taken on line 3—3 of FIG. 2.
FIG. 4 is an enlarged fragmentary view of the bead ring and filler gum being applied to a flat strip of flipper material with a second guide roller taken on line 4—4 of FIG. 2.
FIG. 5 is an enlarged fragmentary view of the second guide roller of FIG. 4 shaping the filler gum onto the flipper strip with a cooperative stitching roller taken on line 5—5 of FIG. 2.
FIG. 6 is an enlarged fragmentary view of a third guide roller and shaping plate taken on line 6—6 of FIG. 2.
Figure 7:
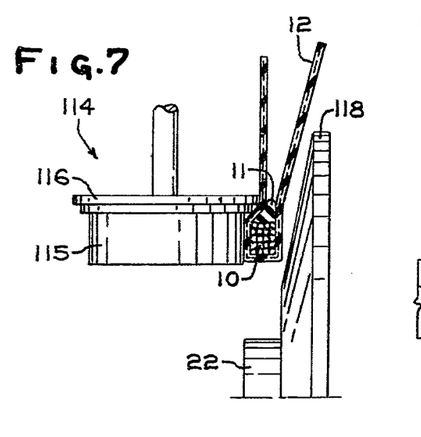
FIG. 7 is an enlarged fragmentary view of a stitching roll and fourth guide roller shaping the flipper cloth about the bead ring taken on line 7—7 of FIG. 2.

As seen in FIG. 1, a shaping plate 140 is mounted on the moveable lever member 106. Shaping plate 140 in the operative position as shown in FIG. 2 has its leading edge 141 closely adjacent to second guide roller 91, to enable it to begin the turn up of the flipper cloth or strip material 12. Shaping plate 140 is contoured to move the horizontal flat flipper cloth into an upright position as depicted by FIGS. 5 and 6. The shaping plate 140 has a reflective tape 142 thereon for a purpose to be described. A rod 143 has one end secured to plate member 15 and extends downwardly therefrom to facilitate the holding of the bead ring 10 in the machine by the guide rollers and stitching rollers as the filler gum and flipper cloth is applied.

In the operation of the apparatus described and assuming an annular bead ring 11 is placed on the bead ring assembly machine wherein the upper portion of the bead ring 10 rests on the first and second guide rollers 92 and 91 substantially as shown in FIG. 2, the operation will be described in conjunction with the circuit diagram.

The electrical control circuitry for the energization of and control of the bead ring assembly is shown in FIG. 10. The main current source is supplied over leads L1, L2, and L3, which leads are connected to the flipper let off motor 150 through contacts M2 and to the filler-flipper motor 18 through contacts MF. A transformer T1 interconnects lines L2, L3, and line L4 to reduce the voltage applied across line L4 to 110 volts. Two parallel leads 151 and 152 are connected to line L4, with suitable ground as shown. A second transformer T2 interconnects lines L2 and L3 with line L5 which line L5 is connected to a rectifier RCT. A contact MR across line L5 is mechanically interlocked with switches MR-1 and MR-2 across lines L6 and L7. Lines L6 and L7 are connected to the field windings of motor 18 to provide a braking action when a D.C. voltage is impressed across such field windings through closed switches MR-1 and MR-2.

Cross conductors or lines 153 through 180 between parallel leads or lines 151 and 152 supply current to the various relays, contacts, and solenoids as described below. A start switch S on conductor 155 upon depression will energize relays R1 and TR1. Energization of relay R1 closes contacts R1 on branch conductor 155a to initiate the holding circuit for the energization of relay R1. Energization of relay R1 also closes contacts R1 on conductors 154 and branch conductor 170 while opening contact R1 on conductor 177. Closure of contact R1 on conductor 154 energizes relay MR which closes switches MR-1 and MR-2 on lines L6 and L7 to energize the braking coils for filler-flipper motor 18. Closing of contact R1 on conductor 170 conditions the circuit for energization of relay T4. By opening contact R1 on conductor 177 a counter C-1 between conductors 177 and 178 is reset to zero. Energization of relay TR1 closes contact TR1 line 157 to energize solenoid SV-1 of solenoid operated valve 200 which interconnects pressurized line 201 with 202 which pressurizes the head of pneumatic cylinder 21 to pivot the lever arm 106 clockwise along with stitching rollers 109, 114, 117 and 126 into position for stitching the filler gum and flipper cloth or strip material onto the bead ring 10. Simultaneously with this action contact TR1 on line 158 is opened to deenergize solenoid SV-2. With this action switch SS-1 on conductor 159 interconnected to contact TR1 on line 158 automatically energizes SV-3 and de-energizes SV-4 which connects pressurized conduit 210 to conduit 211 to pressurize the head end of filler applier cylinder 32 which action extends the piston rod 33 and filler applicator roller 38 against the bead 10 as shown in FIG. 3 to position the filler gum 11 against the bead ring 10.

The footswitch FS-1 on conductor 164 upon depression by the operator will energize relay R2 which closes contact R2 on line 153 which in turn actuates relay MF to close contacts MF on conductors L10, L11 L12 to energize motor 18 which rotates the guide roller or the fourth guide roller 22. Closing of contact R2 on line 153 also energizes Timer Relay T1 which after a suitable time delays opens contact T1 on line 154 to brake motor 18 to permit the operator to place the flipper cloth or strip material 12 onto the second guide roller 92 such that rotation of guide roller 92 will move the flipper cloth underneath the bead 10 as depicted by FIG. 4. The filler gum and flipper cloth are positioned onto the bead 10 in staggered relationship to assure a better and stronger tire bead assembly.

Energization of relay R2 on conductor 164 (by depressing switch FS-1) also opens contact R2 on conductor 163 which de-energizes relay RL1 on conductor 163a which resets the braking circuit.

The energization of drive motor 18 also starts the pulse generator 19 counting pulses which after a predetermined number of pulses closes switch C-1 on conductor 166 which energizes relay RL-1 which in turn opens contact RL1 on line 153 to de-energize relay MF which stops motor 18 and at the same time pulses the motor 18 with a D.C. voltage which brakes the motor. With the motor 18 stopped, the operator releases then again depresses foot switch FS-1 line 164 to reenergize relay R2 which closes contact R2 on line 153 to restart drive motor 18 and the bead ring 10 rotation in the bead machine. Bead ring, filler gum and flipper cloth rotate to a position until a photo-cell 190 (FIG. 1) is actuated by the passage of the flipper cloth going over reflective tape 142 (FIG. 1), thereby actuating cylinder 55 to retract the flipper cloth feed means which includes bracket 52, cylinders 55, 75, cams 60 and 61 and auxiliary related elements. As cams 60 and 61 retract by actuation of cylinder 55, the flipper material is in position for the cutter 83 to make a cut thereon whenever the pre-set number of counts are pulsed on pulse generator 19 to close contact C2 line 167 which energizes relay RL1 which stops the machine rotation and C2 line 171 which energizes relay T3 on line 171 which closes contact T3 on line 172 which energizes solenoid SV-6A. Simultaneously with the energization of relay T3 on line 171, normally closed contact T3 on line 173 is opened de-energizing solenoid operated valve SV-6B. Energization of solenoid SV-6A connects pressurized conduit 220 via solenoid operated valve 222 to connect the pressurized conduit with line 223 which pressurizes the head end of hydraulic cylinder 75 which pivots knife 83 to sever the flipper cloth or fabric material (FIG. 1) in preparation for the completion of the bead being covered by the respective stitcher rolls and shaping plate 140.

Upon completion of the cut, relay T3 is deenergized and contact T3 on line 173 is closed thereby energizing solenoid SV-6B which connects pressurized conduit 220 with line 224 through valve 222 to pressurize the rod end of knife cylinder 75 to pivot the knife 83 upwardly to facilitate the movement of the flipper cloth or fabric upward in preparation for the next application of the fabric to the next bead ring. In this case the flipper cloth is cut while the bead ring is stopped. The rotation begins again immediately upon completion of the flipper cut and the bead ring does not stop again until the entire amount of flipper cloth is applied to the bead ring. Through the pulses and counter 19, contact C-1 on conductor 156 is closed which energizes relay T2 line 156. Relay T2 opens normally closed contact on conductor 160 which deenergizes solenoid SV-3 and energizes solenoid SV-4 line 161 which raises the piston rod in cylinder 32 to break the filler gum 11. Such breaking of the filler is just prior to the completion of the wrap. The end of the cycle occurs when the total number of pulses set, opens contact C-2 on lines 155a and 163 which deenergizes relays RL1, R1 and TR1 which de-energizes relay RL1 on line 164 via open contact RL1 which stops drive motor 18. De-energization of relay TR1 opens or pivots the lever arm 106 and 11 of the stitching rollers 109, 114 and 117 mounted on such lever 106 away from the bead holding ring or guide rollers 91, 90 and 22 to thereby permit the removal of the completed bead ring assembly and permit the insertion of another bead ring 10 into the machine.

In the operation of the tire bead ring assembly, the electrical circuit described above is energized and it is assumed that the flipper cloth is threaded from its supply source through the cams 60–61 and abuts the knife edge 83 in preparation for feeding therefrom, while the filler gum 11 is in the position shown in FIG. 1. A bead ring 10 is placed onto guide rollers 92, 91, 90 and 22 in preparation for the fabrication operation. Switch S on conductor 155 is a push button that is actuated by the operator to close the machine and initiate each cycle. The operator also depresses a foot pedal which closes contact FS-1 on conductor 164. This operation actuates drive motor 18 and will run the drive motor 18 which rotates the guide rollers 22, 117, 114 and 90 thereby rotating the bead ring 10. Simultaneously with actuation of switch S pneumatic cylinder 32 is energized which extends the piston rod and places the filler gum 11 onto the bead ring 10. The filler gum is subsequently applied to the bead ring as the bead ring 10 rotates. The The drive motor 18 will run for a predetermined short period as determined by the pulse generator/counter and then stops. The operator then releases the foot pedal and pulls the flipper cloth onto the first guide roller 91 which will feed the flipper cloth under the bead ring 10 upon energization of drive motor 18. The drive motor 18 is energized by again depressing the foot pedal which closes switch FS-1 on conductor 164. The drive motor 18 remains energized as the flipper cloth passes under the photo cell 190 which actuates pneumatic cylinder 55 to retract the flipper tray or the cloth feed means which includes the bracket 52, bracket means 57, cylinder 75 and auxiliary related elements. The machine continues to run until the flipper counter C-2 on line 180 illustrated in the electrical diagram as a box counts to the pre-set count of 850 which is the example chosen. The machine then stops and cylinder 75 is actuated to pivot cutter 83 to cut the flipper cloth thereby determining that the proper length of fabric cloth is pre-cut for application to the bead ring 10 and the filler gum 11. Drive motor 18 is then actuated automatically by timer contact T-4 line 163a which closes relay contact RL1 line 153 and the bead ring 10, filler gum 11, and flipper cloth 12 is rotated. When the filler counter C-1 line 178 counts out, the dynamic brake for guide roller 38 is actuated, thereby stopping guide roller 38 as pneumatic cylinder 32 is actuated to raise guide roller 38. This action breaks the filler gum as the bead ring is being rotated until the flipper cloth is completely stitched and the flipper counter C-2 counts out. The machine then opens as the rod end of cylinder 21 is pressurized to pivot lever arm 106 counterclockwise to move the stitching rollers away from the bead ring assembly to permit its removal and the placement of another bead ring on the machine.

We claim:

1. A tire bead ring assembly machine for wrapping a filler gum and flipper cloth into and around a tire bead ring comprising support means, bead ring support means mounted on said support means for holding and rotating a bead ring, filler gum feed means mounted on said support means for delivering a predetermined length of filler gum to the outer periphery of said bead ring for attachment thereto as said bead ring rotates, flipper cloth feed means operatively connected to said support means to deliver a predetermined length of flipper cloth to the underside of said bead ring, drive means connected to said bead ring support means for rotating said bead ring, and folding means mounted on said support means for cooperative action with said bead ring support means for folding said flipper cloth about said bead ring and said filler gum as said bead ring rotates to encase said bead ring and filler gum with said flipper cloth.

2. A tire bead ring assembly machine for wrapping a filler gum and flipper cloth as set forth in claim 1 wherein said bead ring support means includes a first guide roller having a circumferential groove for receiving said bead ring, said filler gum feed means includes a guide roller with projections thereon for engaging said filler gum as it is fed thereover onto said bead ring supported by said first guide roller, and said filler gum feed means being operative to sever said filler gum to a predetermined length for application to said bead ring.

3. A tire bead ring assembly machine as set forth in claim 2 wherein said bead ring support means includes a second guide roller operative to receive and guide said flipper cloth onto said bead ring, said second guide roller having a circumferential groove along the circumferential mid-point thereof, and a first stitching roller cooperative with said second guide roller to press said flipper cloth and bead ring into said groove on said second guide roller with said filler gum being pressed into engagement with the outer periphery of said bead ring.

4. A tire bead ring assembly machine as set forth in claim 3 wherein said second guide roller has a pair of laterally spaced guide members cooperative therewith to align the center line of said flipper cloth with the center line of said second guide roller.

5. A tire bead ring assembly machine as set forth in claim 4 wherein said bead ring has a side wall portion, said bead ring support means includes a third guide roller with a flanged end portion, a sleeve axially slidably mounted on said third guide roll and cooperative with said flanged end portion to define a groove therebetween to receive said flipper cloth and bead ring, and biasing means mounted on said third guide roll for biasing said sleeve toward said flanged end portion to frictionally engage said flipper cloth to press said flipper cloth into firm contact with the side wall portions of said bead ring.

6. A tire bead ring assembly machine as set forth in claim 5 wherein a lever arm member is pivotally mounted on said support means, power means mounted on said support means and connected to said lever arm member operative to pivot said lever arm toward and away from said bead ring support means, said first stitching roller journaled on one end portion of said lever arm, a second and third stitching roller mounted on said lever arm for pivotal movement toward said bead ring support means to facilitate the stitching of said flipper cloth to said bead ring, and a flipper cloth folding member located on said lever arm forwardly of said first stitching roller and extending back on said lever arm to said second stitching roller to fold said flipper cloth upwardly around said bead ring.

7. A tire bead ring assembly machine as set forth in claim 5 wherein said bead ring support means includes a fourth guide roller having a flanged portion and a cylindrical portion with an annular outer periphery, said flanged portion tapers outwardly from said cylindrical portion to the outermost edge portion of said flanged portion, a pivotal member mounted on said support means, a fourth stitching roller mounted on one end of said pivotal member for movement toward and away from said fourth guide roller, and said lever arm member having cam means operatively engaging said pivotal member for moving said fourth stitching roller into cooperative action with said third stitching roller and said fourth guide roller to shape and fold said flipper cloth around said bead ring and said filler gum and to adhere the respective outer edge portions of said flipper cloth into abutting contact.

8. A tire bead ring assembly machine as set forth in claim 7 wherein sensing means is operative to control the dispensing of said filler gum and said flipper cloth to provide said predetermined lengths thereof.

9. A tire bead assembly machine as set forth in claim 8 wherein a cutter means is mounted on said flipper cloth feeding means to cut said predetermined length of flipper cloth.

10. A tire bead ring assembly machine as set forth in claim 9 wherein said sensing means includes a reflective tape and an electric eye, said tape on said flipper cloth folding means operative for sensing the flow of flipper cloth thereby, said electric eye cooperative with said reflective tape to provide an output signal counter means responsive to said signal to actuate said cutter means to cut said predetermined length of flipper cloth.

* * * * *